US010832010B2

(12) United States Patent
Luke et al.

(10) Patent No.: US 10,832,010 B2
(45) Date of Patent: Nov. 10, 2020

(54) TRAINING OF CONVERSATIONAL AGENT USING NATURAL LANGUAGE

(71) Applicant: International Business Machines Corporation, Armonk, NY (US)

(72) Inventors: James S. Luke, Cowes (GB); James R. Magowan, Woking (GB)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/000,605

(22) Filed: Jun. 5, 2018

(65) Prior Publication Data

US 2019/0370342 A1 Dec. 5, 2019

(51) Int. Cl.
*G06F 40/56* (2020.01)
*G06K 9/62* (2006.01)
*G06F 9/44* (2018.01)
*G06F 40/284* (2020.01)

(52) U.S. Cl.
CPC .......... *G06F 40/56* (2020.01); *G06F 9/44* (2013.01); *G06F 40/284* (2020.01); *G06K 9/6254* (2013.01); *G06K 9/6263* (2013.01)

(58) Field of Classification Search
CPC ..... G06F 17/27; G06F 17/2881; G10L 15/22; G10L 15/26; G10L 15/265
See application file for complete search history.

(56) References Cited

U.S. PATENT DOCUMENTS

| 7,124,119 | B2 | 10/2006 | Bigus et al. | |
|---|---|---|---|---|
| 9,715,496 | B1* | 7/2017 | Sapoznik | H04M 3/42382 |
| 10,013,979 | B1* | 7/2018 | Roman | G10L 15/063 |
| 10,178,218 | B1* | 1/2019 | Vadodaria | H04L 51/063 |
| 10,223,636 | B2* | 3/2019 | Reddy | G06N 3/004 |
| 2007/0078815 | A1* | 4/2007 | Weng | G06F 16/243 |

(Continued)

FOREIGN PATENT DOCUMENTS

| WO | 2016033291 A2 | 3/2016 |
|---|---|---|
| WO | 2017051104 A1 | 3/2017 |

(Continued)

OTHER PUBLICATIONS

Luke et al., "Training of Conversational Agents Using Natural Language", Application No. PCT/IB2019/054630, filed Jun. 4, 2019.

(Continued)

*Primary Examiner* — Paras D Shah
(74) *Attorney, Agent, or Firm* — James L. Olsen

(57) ABSTRACT

Aspects of the present disclosure relate to training a conversational agent. A conversational agent is initiated with a set of atomic operators, each atomic operator having one or more atomic operator rules for executing operations. A natural language input is received from a user on a conversational interface. A determination is made whether the natural language input maps to an existing script by referencing a rules engine. In response to a determination that the natural language does not map to an existing script, training is requested from the user. Training is then received from the user which maps the natural language input to a script. A mapping rule which maps the natural language input to the script is stored, and the script is executed.

19 Claims, 9 Drawing Sheets

(56) References Cited

U.S. PATENT DOCUMENTS

| | | | |
|---|---|---|---|
| 2010/0185445 A1* | 7/2010 | Comerford | G10L 15/22 704/251 |
| 2012/0265528 A1* | 10/2012 | Gruber | G10L 15/18 704/235 |
| 2014/0122618 A1 | 5/2014 | Duan | |
| 2014/0123117 A1* | 5/2014 | Lee | G06F 11/3672 717/131 |
| 2014/0337814 A1* | 11/2014 | Kalns | G06F 8/00 717/100 |
| 2015/0066479 A1* | 3/2015 | Pasupalak | G06F 17/27 704/9 |
| 2015/0142704 A1* | 5/2015 | London | G06F 16/90332 706/11 |
| 2015/0254061 A1 | 9/2015 | Gelfenbeyn et al. | |
| 2016/0173578 A1* | 6/2016 | Sharma | H04L 67/12 709/203 |
| 2016/0358603 A1* | 12/2016 | Azam | G10L 15/22 |
| 2017/0339042 A1 | 11/2017 | Sommer et al. | |
| 2018/0096072 A1* | 4/2018 | He | G06F 3/0481 |
| 2018/0165691 A1* | 6/2018 | Heater | G06Q 30/016 |
| 2018/0260680 A1* | 9/2018 | Finkelstein | G06N 3/006 |
| 2019/0074003 A1* | 3/2019 | Guthery | G10L 15/285 |
| 2019/0103101 A1* | 4/2019 | Danila | G10L 15/1815 |
| 2019/0156198 A1* | 5/2019 | Mars | G06N 20/00 |

FOREIGN PATENT DOCUMENTS

| | | |
|---|---|---|
| WO | 2017197018 A2 | 11/2017 |
| WO | 2018074729 A1 | 4/2018 |

OTHER PUBLICATIONS

International Search Report, International Application No. PCT/IB2019/054630, dated Oct. 14, 2019, 8 pages.

Azaria et al., "Instructable Intelligent Personal Agent," AAAI, Thirtieth AAAI Conference on Artificial Intelligence, Feb. 2016, pp. 2681-2689.

Lieberman et al., "Instructible agents: Software that just keeps getting better," Retrieved: Nov. 28, 2017, pp. 1-21, http://web.media.mit.edu/~lieber/Lieberary/Getting-Better/Getting-Better.html.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

TRAINING OF CONVERSATIONAL AGENT USING NATURAL LANGUAGE

BACKGROUND

The present disclosure relates generally to cognitive systems, and more particularly to training of conversational agents using natural language.

Cognitive systems provide technology platforms that use natural language processing and machine learning to enable humans and machines to interact naturally in order to extend human expertise and cognition. Cognitive systems may use conversational agents that converse with a human user and interpret and respond to statements made by the user in ordinary natural language.

SUMMARY

Embodiments of the present disclosure relate to training a conversational agent. A conversational agent can be initiated with a set of atomic operators, each atomic operator having one or more atomic operator rules for executing operations. A natural language input can be received from a user on a conversational interface. A determination can be made whether the natural language input maps to an existing script by referencing a rules engine having a plurality of mapping rules. In response to a determination that the natural language input does not map to an existing script, training can be requested from the user. Training from the user on the conversational interface can then be received which maps the natural language input to a script in response to the clarification request. A mapping rule which maps the natural language input to the scrip can then be stored, and the script can be executed.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
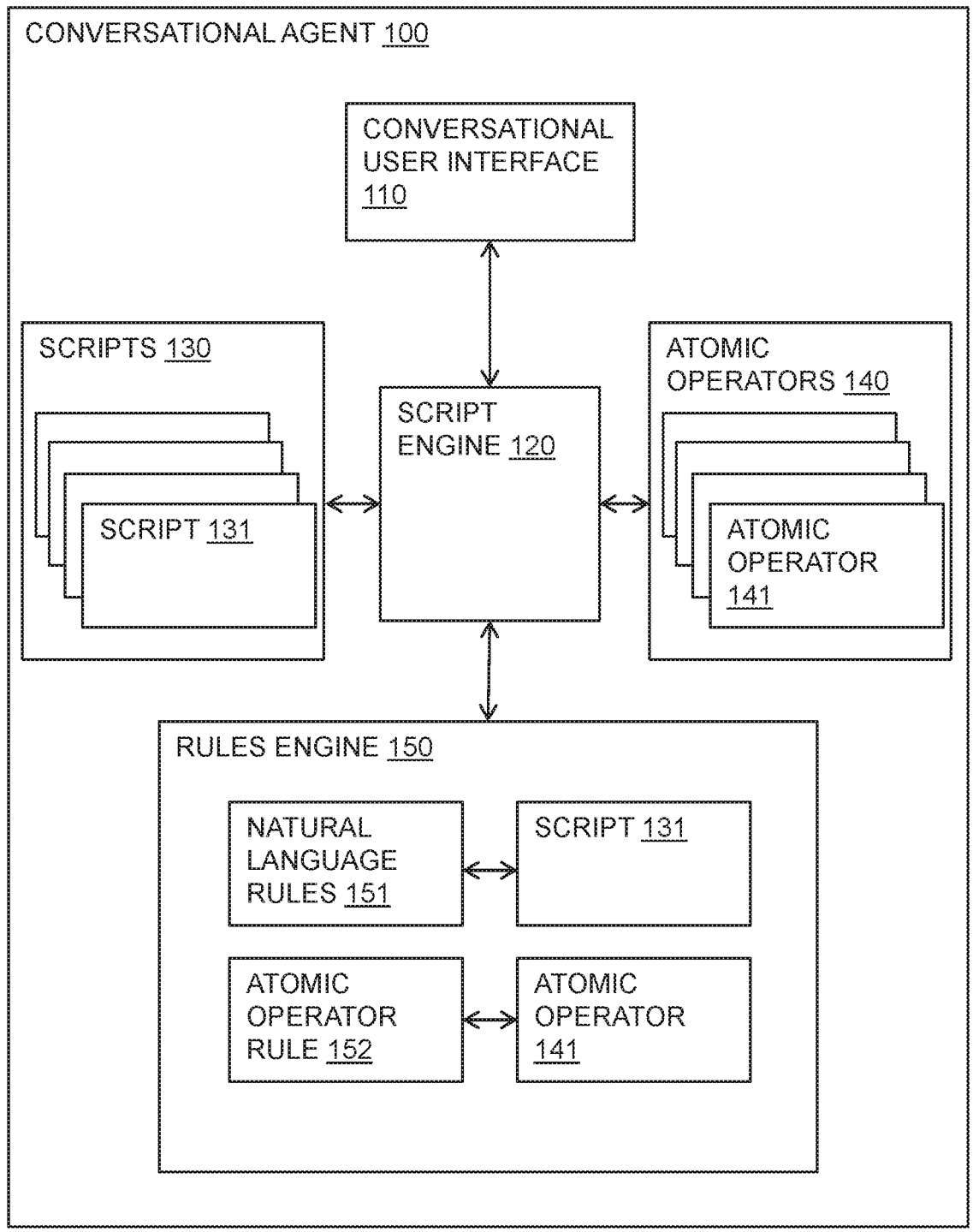
FIG. 1 is a block diagram illustrating a conversational agent, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cognitive systems, and in particular to training of conversational agents using natural language. While the present disclosure is not necessarily limited to such applications, various aspects of the disclosure may be appreciated through a discussion of various examples using this context.

Development of conversational agents is a technical task undertaken by specialists using technical tooling and programming models. Known conversational agents are generally coded or trained to respond to certain inputs with certain outputs. Some use a semantic model and others have this semantic knowledge embedded in either a machine learning model, a set of rules, actual code or some other mechanism.

Using a pre-defined formal knowledge representation limits the application of the conversational agent. Known conversational agents cannot be applied to new problem domain without formally defining the knowledge representation.

Aspects of the present disclosure relate to a conversational agent that is trained through natural language input. Embodiments include a conversational interface and a set of atomic operators. A user is able to instruct the system, via the conversational interface, to execute operations defined by the atomic operators.

A user can also, through conversational interaction, teach the system to map natural language inputs onto scripts comprising one or more atomic operators. Scripts can also include natural language sentences. A rules based artificial intelligence engine manages the mapping of natural language inputs onto scripts.

The system may start with very limited capability, however, over time a massive amount of intelligence can be acquired by the system. A range of machine learning algorithms may operate in the background to generalize the natural language understanding so that the user does not have to enter every possible permutation of phrasing.

On initiation, the system may only be configured to execute atomic operations. However, the system may be configured to query for clarification when an input is not understood such that the intelligence of the system is expanded. As the user builds hierarchies of complex natural language instructions mapped onto hierarchies of scripts, more complex conversations can be processed.

Referring now to FIG. 1, shown is a block diagram illustrating a conversational agent 100, in accordance with embodiments of the present disclosure. The conversational agent 100 includes a conversational user interface 110 for receiving user instructions in the form of natural language inputs. The conversational agent 100 further includes a core script engine 120 and a rules engine 150 that manages the mapping of natural language inputs.

The conversational agent 100 includes a set of atomic operators 140 (comprised of one or more individual atomic operators 141) that are executed by the script engine 120. The set of atomic operators 140 can be pre-defined (and may not be editable). The set of atomic operators 140 are effectively reserved words that, when identified, cause a particular operation execution. For example, an atomic operator "Plus" may execute an arithmetic addition operation for two numerical inputs. The user may define new instructions using natural language which can be comprised of a series of existing atomic operators.

The conversational agent 100 also includes a set of scripts 130 (including one or more individual scripts 131) each having a sequence of one or more atomic operators and natural language sentences. New scripts may be built by the script engine 120 as it is trained by user inputs. In embodiments, the scripts 130 may be hierarchically organized. For example, the set of scripts 130 can include parent scripts having one or more child scripts or sub-scripts (which may themselves include one or more sub-scripts).

The script engine 120 reads instructions from an individual script 131 and interacts with the rules engine 150 to process those instructions. The most basic form of instruction comprises an atomic operator 141. The atomic operator 141 is defined by one or more atomic operator rules 152 that describe the input required call (e.g., trigger) the atomic operator 141. Based on the input and the function of the atomic operator 141, a corresponding output is transmitted (e.g., to the conversational user interface 110).

The rules engine 150 includes atomic operator rules 152 mapped to respective atomic operators 140 and natural language rules 151 which map natural language instructions to scripts 131.

Figure 2:
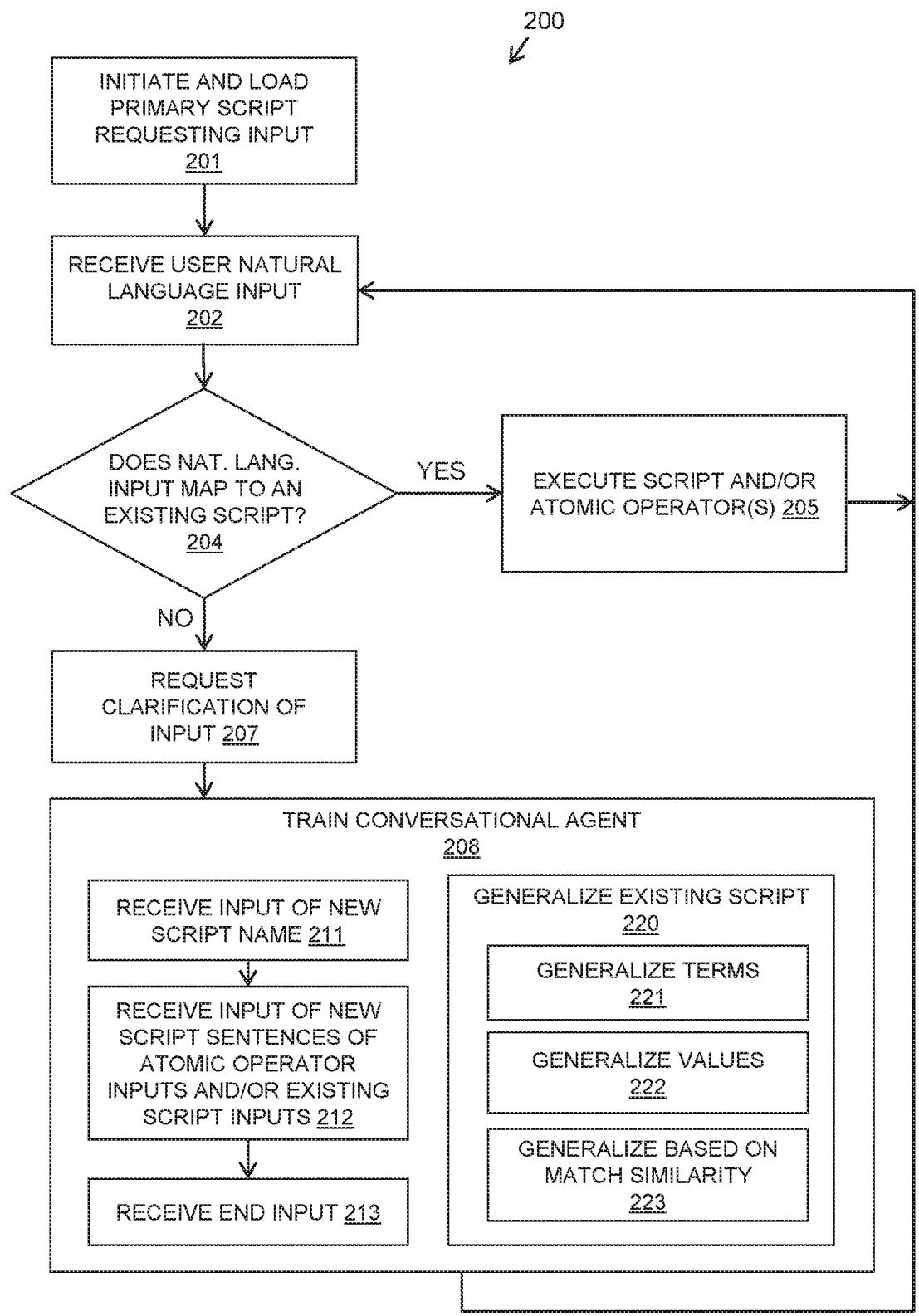
FIG. 2 is a flow-diagram illustrating a process for training a conversational agent based on a natural language input, in accordance with embodiments of the present disclosure.

Referring to FIG. 2, shown is a flow diagram 200 illustrating an example process 200 for training a conversational agent (e.g., conversational agent 100), in accordance with embodiments of the present disclosure.

Process 200 initiates where a primary script is initiated and loaded. This is illustrated at step 201. The primary script can be automatically initiated and loaded by the script engine 120 upon initialization. The primary script defines the core functionality of the conversational agent. For example, the primary script facilitates loading existing scripts 130, generating new scripts, generalizing existing scripts 130, and calling atomic operators 140. The primary script can prompt (e.g., request) user input. For example, upon loading and initiating the primary script, the conversational agent may be configured to provide a status (e.g., "I'm up and running.") and prompt user input by providing a text input window on the conversational interface 110. User natural language input is then received. This is illustrated at step 202. Natural language input can include any alphanumeric characters to be processed by the conversational agent 100. For example, natural language input can include questions (e.g., "What is the sum of 4 and 5?", "How is the weather?", "What time is it?", etc.) and/or statements (e.g., "George Washington was the first president.").

The conversational agent 100 may then determine if the natural language input maps to an existing script. This is illustrated at step 204. Determining whether the natural language input maps to an existing script can be completed by referencing the rules engine 150. The rules engine 150 includes natural language rules 151 which can be used to call specific scripts. For example, if a natural language input maps to a rule in the natural language rules 151, a corresponding script 131 can be executed by loading the script and iterating through the instructions (e.g., which may include one or more atomic operators and/or one or more subscripts) specified in the script. Similarly, if an instruction in a natural language input maps to a rule in the atomic operator rules 152, then a corresponding atomic operator is executed. This is illustrated at step 205. Further details regarding script execution are provided below with reference to FIG. 3. In embodiments, if the executed script contains natural language inputs, these inputs are received as inputs at step 202 and a determination can be made whether these inputs map to an existing script at step 204.

If there is no match to an existing script, clarification of the input is requested. This is illustrated at step 207. Clarification can be requested by setting a default rule that is called in response to a determination that no other existing rules have been triggered. For example, if a user queries "How many milliliters are in a liter?", and the natural language input instruction does not map to any rules in the rules engine 150, a default script (e.g., DontUnderstand.scr) can be called such that the conversation agent outputs a clarification notification at the conversational interface 110. The user can then train the conversational agent 100 such that it understands this natural language input instruction in the future. This is illustrated at step 208. The user training can be completed in various manners.

In some embodiments, training includes generating a new script (e.g., steps 211-213). To generate a new script, an input of a new script name can be received. This is illustrated at step 211. The script name can be used to reference the new script in order to execute the instructions therein. In embodiments, the newly generated script is called by generating one or more rules (e.g., at the rules engine 150) to call the script. After the script name is received, the instructions of the script are received. These include one or more atomic operators and/or existing scripts (which, if integrated into the new script, become sub-scripts) which are used to address the natural language input. Finally, an "end" input is received such that the new script is finalized. Accordingly, after a user transmits the same input into the conversational interface 110 (e.g., "How many milliliters are in a liter?"), the natural language input can be referenced in the rules engine 150 to retrieve the newly generated script and respond to the input (e.g., 1000 milliliters).

In embodiments, user training can include generalizing an existing rule and/or script. This is illustrated at step 220. Generalization of an existing script can be completed in a variety of manners. For example, in some embodiments, generalizing can include generalizing terms specified in one or more rules and/or scripts for structurally similar input phrases. This is illustrated at step 221. As an example, assume a user trained the conversational agent to understand "Add x to y," where x and y are integers, and later the user presented "What is the sum of x and y". The conversational agent can be configured to handle the query "What is the sum of x and y?" similar to "Add x to y". In such a case, two structurally similar input phrases can be compared to identify identical terms (e.g., "Add <numeric> to <numeric>" vs. "What is the sum of <numeric> and <numeric>"). The output script can be examined for the existence of any of the identical terms, and these identical terms can be replaced with references to the original input (E.g., "What is the sum of <numeric> and <numeric>?" can be replaced with "Add <numeric> to <numeric>". Further detail regarding generalization will be discussed in FIG. 4.

In embodiments, training can include generalizing values for two natural language inputs with identical terms. This is illustrated at step 222. Following the example above, if the conversational agent is trained to respond to query "What is the sum of 6 and 8?", and at a later time the user presented a query "What is the sum of 8 and 10?", the conversational agent can be configured to automatically generalize the specified numerical values. In this example, the values "6" and "8" can be replaced with general numerical place holders (e.g., <numeric>). Accordingly, if a user later presented "What is the sum of 8 and 10?", based on the generalization, the conversational agent would output the sum of 8 and 10. As another example, if a natural language input is "What color is the sky?", the term "sky" can be generalized to an "object." Accordingly, instead of requiring the term "sky" to call the script (e.g., according to a natural language rule), any "object" can be used to call the script. For example, if a user input "What color is the grass?", the same script could be called. In this example, the instruction including the term "sky" can also be generalized to an "object." Based on the characteristics defined for the object "grass", the color can be output by the conversational agent.

In embodiments, generalizing values can be completed by determining a superclass which encompasses values for two different inputs. For example, for specific integers, a super class can be defined as "numerical integer." As another example, for specific states in the United States, a superclass can be defined as "US State." In embodiments, a superclass which encompasses different values in two inputs can be determined by tokenizing the natural language inputs to identify the values. The values can then be parsed with respect to a relational database (RDB) to determine the hierarchical and relational positioning of the values in the RDB. Based on the "parent node" (e.g., superclass) for both values of the two inputs, the superclass can be selected. The values can then be replaced with the superclass such that future natural language inputs including subclasses of the superclass can be processed.

In embodiments, generalizing rules and/or scripts can be completed based on a natural language input match similarity. This is illustrated at step 223. For example, if a user trained the conversational agent with a script for responding to "Add 4 and 5," and later the user presented a natural language input with "Added 4 and 5," the conversational agent can be configured to automatically generalize the rule mapping and/or script to accommodate to a minor variation in the natural language input. In embodiments, a similarly threshold can be implemented to determine whether two inputs can be mapped to the same output. For example, the similar threshold may specify that there must be a specific number of matching characters (e.g., 10 matching characters, 90% matching characters, etc.) in order to generalize two given inputs. In some embodiments, this can be completed by including additional rules in the rules engine 150 which can allow the same script execution in response to the differentiated natural language input (e.g., the rule includes the functionality to call the script using the two variations). Typically, a rule simply maps an input to an output. However, by generalizing, multiple input variations can be mapped to a single output. Further, varying inputs can lead to distinct outputs (e.g., by generalizing values, such as adding any two integers), Once the conversational agent 100 has received user training at step 208, the user natural language is re-input by the user and the process 200 can be reiterated. In the subsequent iteration, the input may now map to an existing script. However, if the input still does not map to a script or operation, further clarification can be requested at step 207.

Reference is now made to an example illustrating a user interaction on a conversational interface (e.g., conversational interface 110 of FIG. 1). In this example, the conversational agent 100 is referred to as "JEM".

A user may teach the conversational agent some basic mathematics as shown in the conversation below:

User: add 4 to 5
    JEM: I don't understand=>"add 4 to 5"
    User: JEMCreateScript "add 4 to 5"
    JEM: Please enter the script sentences and use JEMEndScript when finished.
    User: sum=4 JEMPlus 5
    User: JEMDefine lastResult=$sum
    User: JEMOutput $sum
    User: JEMEndScript
    JEM: Thank you for creating a script for "add 4 to 5"
    User: add 4 to 5
    JEM: 9
    User: add 1 to 3
    JEM: I don't understand=>"add 1 to 3"
    User: "add 1 to 3" JEMHandleLike "add 4 to 5"
    User: add 1 to 3
    JEM: 4
    User: add 5 to 3
    JEM: 8
    User: what's 4 and 5
    JEM: I don't understand=>"what's 4 and 5"
    User: "what's 4 and 5" JEMSameAs "add 4 to 5"
    User: what's 4 and 5
    JEM: 9

In the conversation above, the atomic operators 141 are:
1. JEMCreateScript
2. JEMPlus
3. JEMOutput
4. JEMEndScript
5. JEMHandleLike
6. JEMSameAs In the conversation above, the user initially inputs a natural language instruction which is not understood (e.g., no rules map the natural language input to existing scripts or atomic operators) by the conversational agent. Accordingly, the conversational agent 100 retrieves a default script for prompting a notification to the user that the system does not understand the input (e.g., step 207 of FIG. 2). In this instance, the user trains the conversational agent with a new script (e.g., steps 211-213). The user first specifies a script name: "add 4 to 5", and then follows up with relevant script sentences (e.g., including an addition atomic operation). The user then closes the script. Upon reentering the same natural language phrase (add 4 to 5), the conversational agent retrieves the "add 4 to 5" (e.g., based on the natural language phrase being mapped to the script as specified in the natural language rules) script and executes the instructions within the script, outputting the sum of 4 and 5.

The user then inputs a similar natural language phrase, but with different numerical values. The conversational agent does not understand the natural language phrase, as the natural language phrase could not be mapped to any scripts. In response to the clarification prompted by the conversational agent 100, the user inputs an atomic operator "JEMHandleLike" and maps the natural language phrase "add 1 to 3" to "add 4 to 5". The script "add 4 to 5" is then retrieved and generalized. That is, the mapping to retrieve the script "add 4 to 5" is now generalized to "add <numeric> to <numeric>" and the script instruction "sum=4 JEMPlus 5"

is generalized to "sum=<numeric>JEMPlus <numeric>". This allows the JEM conversational agent 100 to handle addition of any two numbers as long as the phraseology consists of "add <numeric> to <numeric>".

The user then inputs a similar natural language phrase with different wording: "what's 4 and 5". The conversational agent does not understand the input even though it has the same meaning as "add 4 and 5" (as the phrase is not mapped to any scripts by the defined rules). In response to the clarification response by the conversational agent, the user inputs the atomic operator "JEMSameAs" mapping "what's 4 and 5" to "add 4 to 5". As a result, the system is taught to map "what's<numeric> and <numeric>" onto "add <numeric> to <numeric>" (e.g., these natural language phrases are both stored in the natural language rules in order to call the "add 4 to 5" script). Accordingly, in response to receiving an input "what's 4 and 5", the system outputs the sum of 4 and 5.

JEM is also capable of supporting the cascading of scripts (e.g., referencing multiple scripts or script hierarchies for a single input) as depicted in the conversation below:
User: what's the average of 14 and 52
JEM: I don't understand=>"what's the average of 14 and 52"
User: JEMCreateScript "what's the average of 14 and 52"
JEM: Please enter the script sentences and use JEMEnd-Script when finished.
User: add 14 to 52
User: divide by 2
User: JEMEndScript
User: what's the average of 14 and 52
JEM: I don't understand=>"divide by 2"
User: JEMCreateScript "divide by 2"
JEM: Please enter the script sentences and use JEMEnd-Script when finished.
User: result=$lastResult JEMDivideBy 2
User: JEMOutput $result
User: JEMEndScript
JEM: Thank you for creating a script for "divide by 2"
User: what's the average of 14 and 52
JEM: 33

This example illustrates that the user is able to define complex hierarchies of scripts to process natural language questions. Multiple scripts can be referenced in response to a given natural language input. As depicted above, the script "what's the average of 14 and 52" and its child script "divide by 2" are both referenced in order to provide an output to "what's the average of 14 and 52." Each script can itself be written in natural language. Eventually, a series of atomic operations are called to take the action desired by the user.

Figure 3:
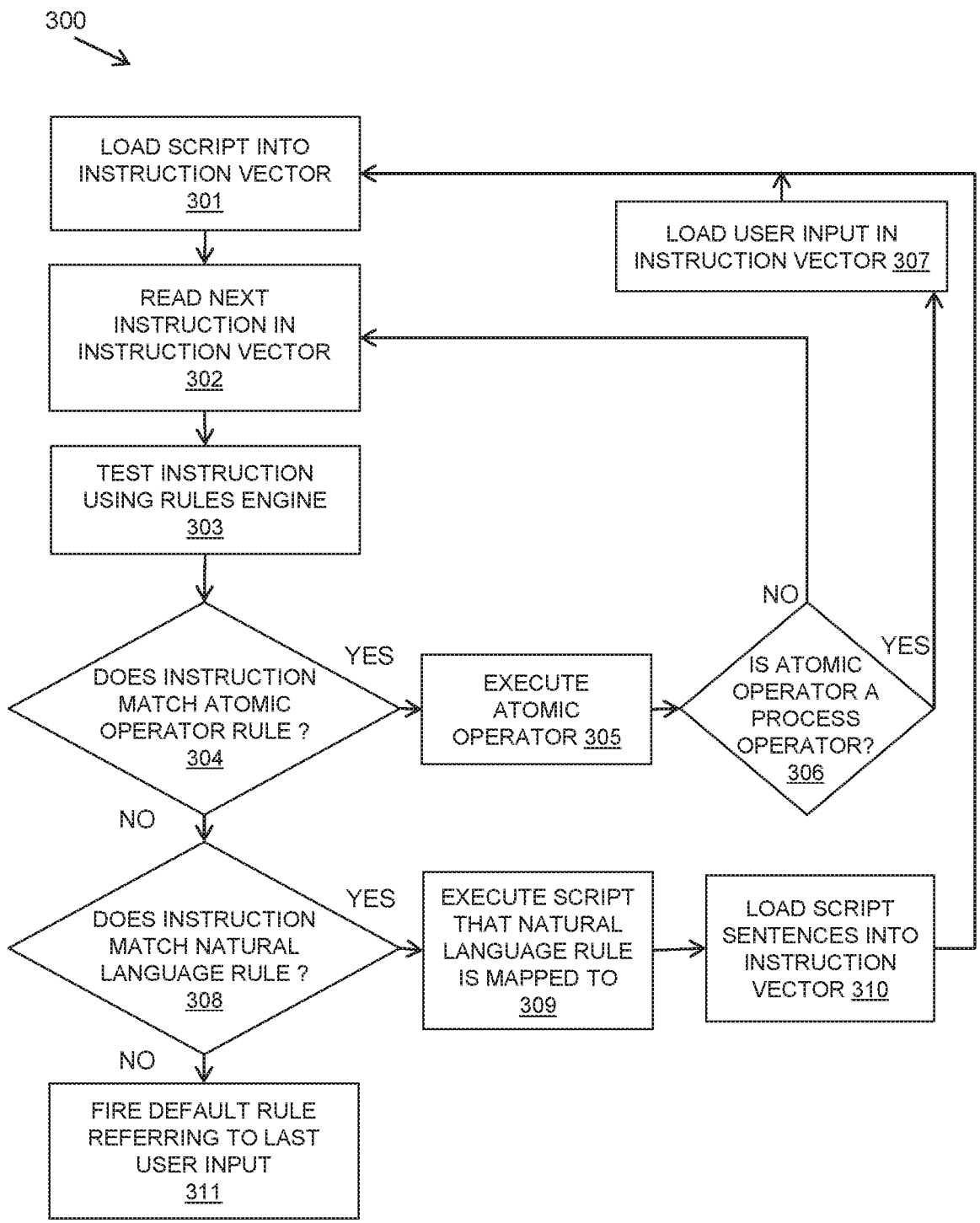
FIG. 3 is a flow-diagram illustrating a process for executing a script, in accordance with embodiments of the present disclosure.

Referring now to FIG. 3, shown is a flow diagram illustrating an example process 300 of executing a script (e.g., script 131) at a script engine (e.g., script engine 120).

On initiation, the script may be loaded into an instruction vector. This is illustrated at step 301. A next instruction in the instruction vector is read. This is illustrated at step 302. Initially, the "next instruction" refers to the first instruction within the instruction vector. The instruction is then tested using a rules engine (e.g., rules engine 150). That is, the rules engine determines whether the instruction is mapped to one or more rules (e.g., atomic and/or natural language rules). A determination is made whether the instruction matches an atomic operator rule. This is illustrated at step 304. If a determination is made that the instruction matches an atomic operator, the atomic operation is executed. This is illustrated at step 305. Upon executing the atomic operation, a determination is made whether the atomic operator is a process operator. A "process atomic operator" may include text defined by a user in the operator, and the text may be added to the instruction list (see Table 1 below for more detail). If the atomic operator is a process atomic operator, then the user input is fed into the instruction vector such that it is tested against the rules. This is illustrated at step 307. If the atomic operator is not a process atomic operator, then the conversational agent may read the next instruction in the instruction vector. This is illustrated at step 306.

Instructions are processed in the order in which they are listed in the script. If, mid-way through the script, there is an instruction that results in a sub-script being called, the instructions in the sub-script are executed before returning to the next instruction in the original script.

In addition to atomic operator rules, natural language rules map instructions onto scripts. Accordingly, if the instruction does not match an atomic operator rule at step 304, a determination is made whether the instruction matches a natural language rule. This is illustrated at step 308. If the instruction matches a natural language rule, the script that is mapped to the natural language rule is executed (following the example above, the natural language input "what is 4 and 5?" is mapped to the script "what is 4 and 5?" by the rules engine). This is illustrated at step 309. The script is executed by loading the script sentences into the instruction vector and then iterating through those instructions. This is illustrated at step 310.

If the instruction does not match a natural language rule, the conversational agent may execute a default rule requesting clarification regarding the last user input. This is illustrated at step 311. This allows the user to teach the conversational agent 100 how to respond to the last user input in the future (e.g., by generating one or more new scripts and/or generalizing existing scripts).

For the purposes of an example, an implementation of a conversational agent is described that includes the following atomic operators. Again, the conversational agent is referred to as "JEM".

TABLE 1

JEM Operators

| ATOMIC OPERATOR | RULE | ATOMIC OPERATOR INPUT | FUNCTIONALITY DESCRIPTION |
|---|---|---|---|
| JEMExecute | JEMExecute {ScriptName} {LineNumber} | JEMExecute "1.scr" 2 | Execute the script {ScriptName} starting at line {LineNumber} |
| JEMInput | {Variable} = JEMInput | UserInput = JEMInput | Reads an input sentence from the Conversational Interface into the defined variable. |
| JEMHandleLike | {Phrase} JEMHandleLike {Phrase} | "add 1 to 3" JEMHandleLike "add 4 to 5" | Teaches JEM that two phrases are equivalent but have different values. |
| JEMOutput | JEMOutput {Phrase} | JEMOutput "Hello World" | Outputs the text defined by {Phrase} to the Conversational Interface. |
| JEMPlus | {variable} = {number1} JEMPlus {number2} | Sum = 4 JEMPlus 5 | Adds number1 to number2 and puts the result into the defined variable. |

TABLE 1-continued

JEM Operators

| ATOMIC OPERATOR | RULE | ATOMIC OPERATOR INPUT | FUNCTIONALITY DESCRIPTION |
| --- | --- | --- | --- |
| JEMProcess | JEMProcess {Phrase} | JEMProcess "say hello" | Takes the text defined by Phrase and add it to the instruction list. |
| JEMSameAs | {Phrase} JEMHandleLike {Phrase} | "what's 4 and 5" JEMHandleLike "add 4 to 5" | Teaches JEM that two phrases are structurally different but mean exactly the same thing. |

On first initiation, the rules shown in Table 1 are loaded into the rules engine 150. When the conversational agent 100 starts up, either during first initiation or on subsequent initiations, the script engine 120 automatically loads the script contained in the file "1.scr". This is a primary script and defines the core functionality of the conversational agent 100.

The conversational agent 100 may be supplied with the version of 1.scr shown below:
  JEMOutput "I'm up and running"
  originalInput=JEMInput
  JEMProcess $originalInput
  JEMExecute "1.scr" 2

This primary script instructs the script engine 120 to announce that the agent 100 is up and running, read an input from the conversational user interface 110, process that input, and then iterate back to line 2 to read the next input from the conversational user interface.

On initiation, the primary script is loaded into an instruction vector. The script engine 120 iterates through the instruction vector parsing each instruction and comparing each instruction to rules specified in the rules engine 150. If an instruction matches one of the atomic operator rules 152, then the atomic operator 141 is executed. The JEMProcess atomic operator places the user input held in $originalInput into the instruction vector so that it is tested against the rules in the rule engine 150.

In addition to atomic operator rules, natural language rules 151 map instructions onto scripts 131. If an instruction matches such a natural language rule 151, the script 131 is executed by loading the script sentences into the instruction vector and then iterating through those instructions.

On initiation, a default rule can be configured that only activates if no other rules are called (e.g., triggered, activated). This default rule calls a script: "DontUnderstand.scr" which queries the user for clarification. The "DontUnderstand.scr" is shown below:
  JEMOutput "I don't understand=>JEMReference"
  JEMReference referring to the last User Input.

Figure 4A:
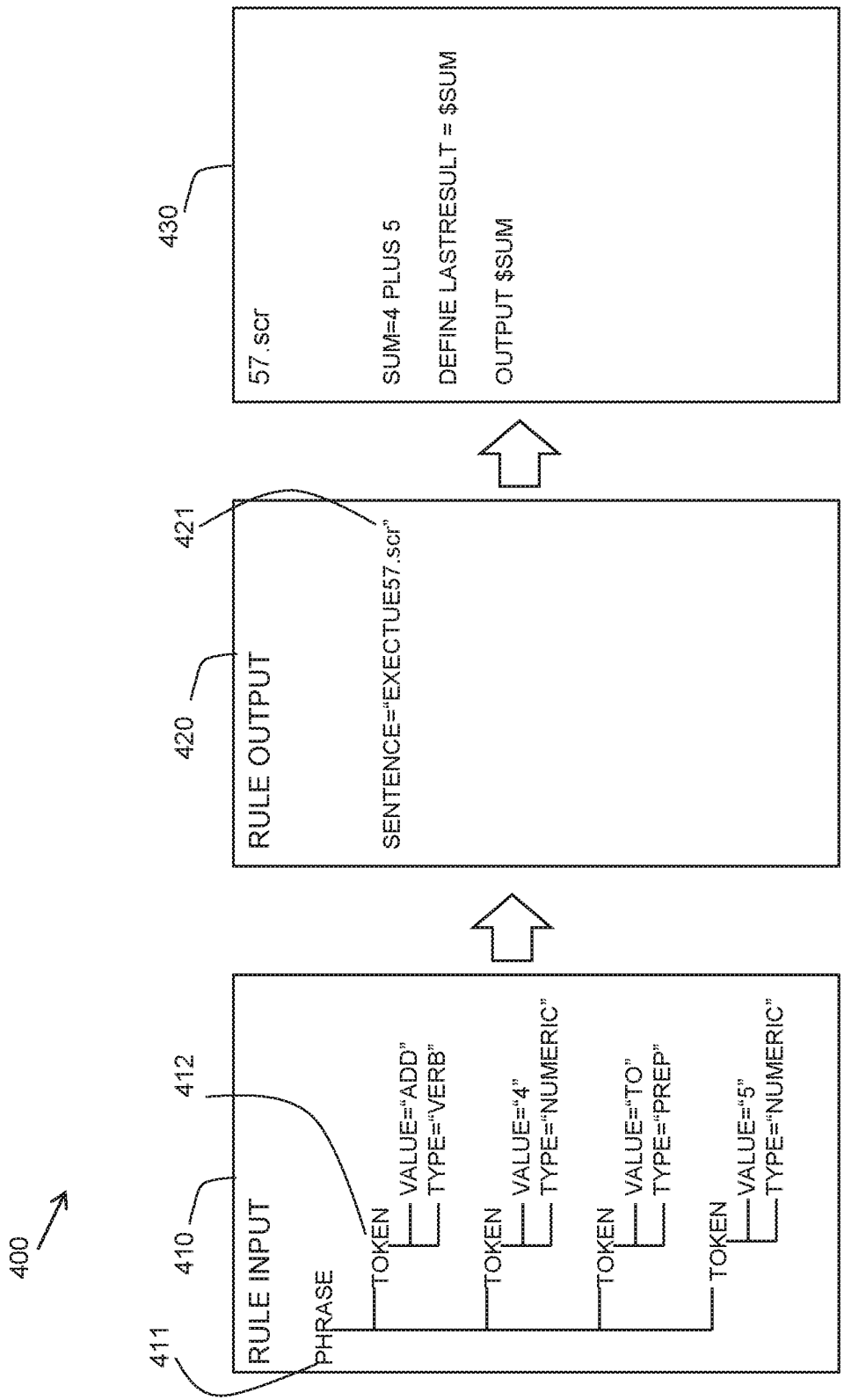
FIG. 4A is a schematic illustrating an example of processing a rule by the rules engine, in accordance with embodiments of the present disclosure.

FIG. 4A is a schematic illustrating an example of processing a rule by the rules engine (e.g., rules engine 150), in accordance with embodiments of the present disclosure. Rules comprise a rule input parse tree 410 and a rule output 420. The rules engine 150 compares the parse tree of any instruction with the parse tree of a rule input 410. If there is a match, then the rule output 420 is placed into the instruction vector.

The example rule shown in FIG. 4A includes a rule input parse tree 410 of a phrase 411 "add 4 to 5". The phase 411 has tokens 412 for each term of the phrase 411. The term "add" has a type "verb" and value "add", the term "4" has a type "numeric" and value "4", the term "to" has a type "prep" and value "to", and the term "5" has a type "numeric" and value "5". The rule output 420 instructs the execution of a script "sentence=execute57.scr" 421. The script 430 identified by the rule output 420 is shown as:
  Sum=4 plus 5
  Define LastResult=$Sum
  Output $Sum A generalization algorithm is described that is implemented using the atomic operator JEMHandleLike. The generalization algorithm compares two structurally similar input phrases to identify identical terms. The algorithm then examines the output script for the existence of any of the identical terms and replaces them with references to the original input. An example of the rule and script shown in FIG. 4A after generalization is shown in FIG. 4B.

Figure 4B:
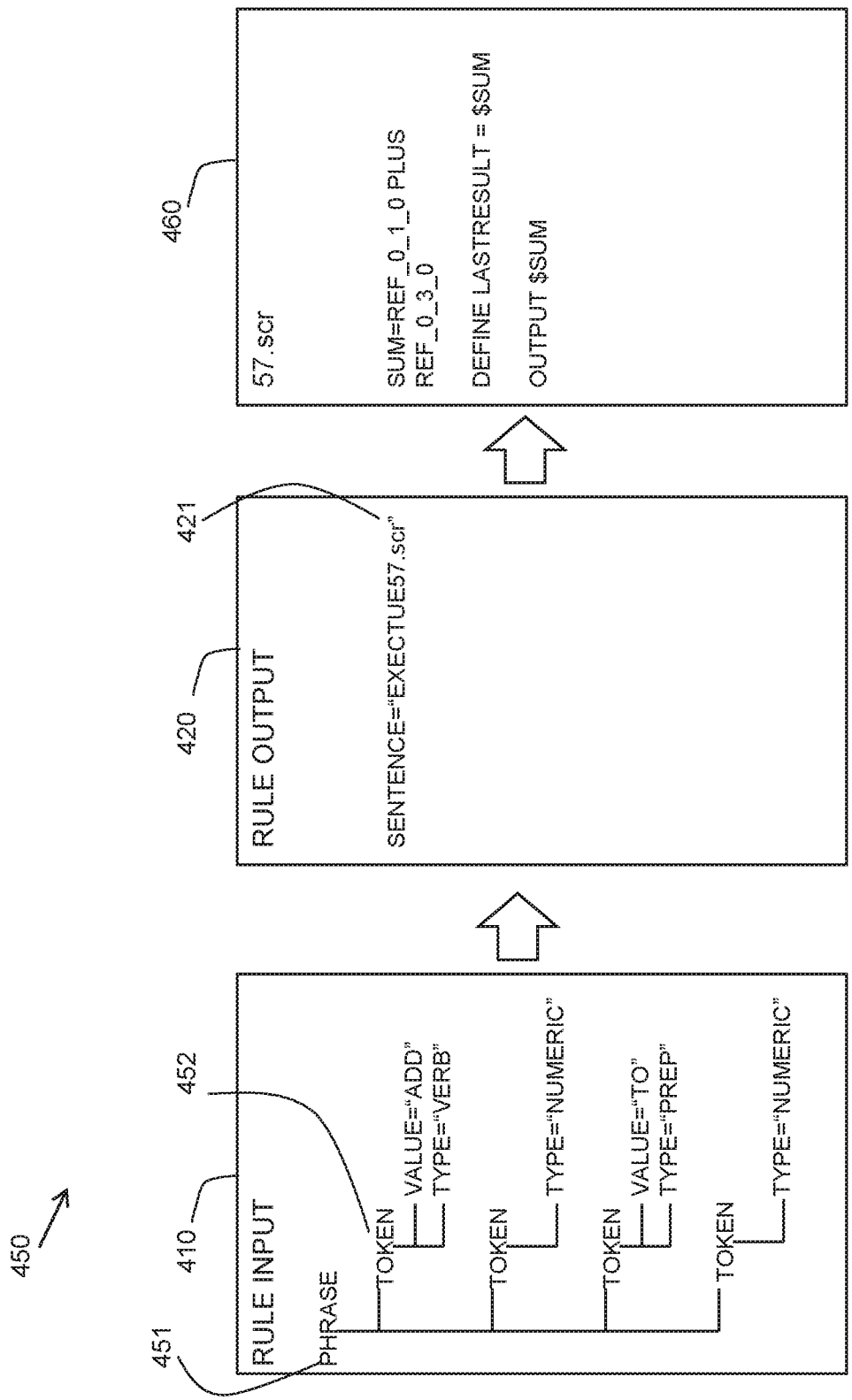
FIG. 4B is a schematic illustrating an example of generalizing the rule depicted in FIG. 4A, in accordance with embodiments of the present disclosure.

The example rule shown in FIG. 4B includes a rule input parse tree 410 in which the phrase 451 is generalized to "add <numeric> to <numeric>". The phase 451 has tokens 452 for each term of the phrase 451. The token for the term "4" has a type "numeric" and the value "4" is removed thereby generalizing it to any value. Similarly, the term "5" has a type "numeric" and the value "5" is removed thereby generalizing it to any value.

The rule output 420 maintains the instruction of the execution of a script "sentence=execute57.scr" 421.

However, the script 460 identified by the rule output 420 is generalized to:
  Sum=Ref_0_1_0 plus Ref_0_3_0
  Define LastResult=$Sum
  Output $Sum Ref_0_1_0 and Ref_0_3_0 refer to a token or phrase in the input tree. The input tree may be a hierarchy with a top level phrase node including corresponding child nodes.

In addition, a generalization of mapping rules may be implemented with the atomic operator JEMSameAs. Initially a rule may be created that simply maps an input onto an output. This rule may then be generalized by comparing the input phrases to identify identical terms and generalizing in the same manner as JEMHandleLike.

In this example, "what's<numeric> and <numeric>" maps to "add <numeric> to <numeric>" that then maps onto a rule output in the form of a script.

Cascading generalizations through a hierarchy of scripts may be provided. For example, when the system generalizes a first rule and/or script, corresponding sub-scripts can also be referenced in order to locate the generalized terms. If the sub-scripts also include generalized terms, they can also be generalized in a similar manner to the parent scripts (e.g., removing number values and generalizing them to any numeric value).

An auto-learning process may be provided aimed at simplifying the generalization process. If an input is similar in structure or value(s) to an existing rule, the system may ask the user if the input should be handled by the existing rule. If the user confirms that it should, the rule and script can be automatically generalized.

For auto-learning, the system compares every input with previously received inputs. There are three types of comparison:

1. Is the input structurally identical to a previous input but differing in values? For example, "add 1 to 7" is structurally identical to "add 4 to 5".

2. Is the input different structurally but contains similar value terms? For example, "what is 4 add 5" is similar to "add 4 to 5".

3. Does the input differ by only a couple of letters (i.e. a fuzzy match that could indicate a typing error)? For example, "added 4 to 5" instead of "add 4 to 5".

If any of these comparison tests indicate a match, the user may be asked if the sentences mean the same thing (for example in 2 and 3 above) or should the sentences be handled in the same way (for example in 1 above). JEMHandleLike or JEMSameAs are then called as appropriate. In some embodiments, fuzzy matching can be completed based on a threshold number of similar alphanumerical characters. For example, the input can be analyzed and compared to an input that is mapped to a given script based on a threshold number of matching characters (e.g., the input meets a threshold level of similarity to an existing natural language rule). If the threshold number of matching characters is met, then a determination can be made that there is a fuzzy match, and a generalization protocol can be executed.

In some embodiments, automatic toggling of rule features may be provided in response to generalization. This means that a rule feature is deactivated for generalization and activated for specialization. In the example "add 4 to 5" there are features for "value='4" and "value='5"—when these values are replaced with references, those features are no longer tested (e.g., the rule feature is deactivated). Each feature is associated with a "test" attribute that is set to either true or false to determine whether that feature should be tested.

The provision of an interactive system and method for the development of a conversational agent reduces the cost, time and technical skills required to develop conversational agents. In addition, it enables the continual learning of a conversational agent in response to interactions with users whilst being operational. The system is trained through interactive conversation and addresses the challenges of using natural language to store knowledge, hierarchies of commands, mapping natural language commands to scripts, and generalization. Embodiments improve the functionality of computer systems by building massive knowledge representations via scripts and sub-scripts. The hierarchical organization of scripts can allow rapid information retrieval and increased throughput.

Further, computer systems could not previously build such knowledge representations (e.g., organized into a plurality of scripts having atomic operators) in such a manner. By prompting clarification to a user for unknown concepts, the system can "fill in" knowledge gaps by prompting users to define new problems and/or generalize existing scripts.

Embodiments further enable hierarchy of natural language scripts. Accordingly, it is possible to derive a plan where the detail of a particular step will only be determined at a later time.

Embodiments enable the capability to generalize natural language sentences (for example, "add 4 to 5" and "what's 4 and 5?").

Aspects do not require a pre-defined semantic model. This means that they can be applied to new problem domains immediately without the need to formally (mathematically) define a semantic model.

The following is an additional example of a script to answer questions. The top level script would be triggered by the user entering the question, "When was Neil Armstrong born?". This would cause a script to run comprising:

SCRIPT A
results=JEMSearchWeb "Neil Armstrong"
facts=JEMAbstract $results
JEMNote $facts
factResults=JEMSearchNarrative "Neil Armstrong"
JEMProcess $factResults "When was Neil Armstrong born?"

The first line of Script A would execute an atomic operation to search the internet to find a sentence summarizing Neil Armstrong, such as "Neil Armstrong, the first person to walk on the moon, was born on 5 Aug. 1930".

The second line would abstract these sentences (using previously learned rules) into facts "Neil Armstrong was the first person to walk on the moon" and "Neil Armstrong was born on the 5 Aug. 1930".

The third line would write these facts to the narrative.

The fourth line would search the narrative for facts about Neil Armstrong.

Finally, the fifth line would processes each fact in the context of the answer. For example, the rules regarding the context (e.g., based on a parse tree comparison) would then ignore, "Neil Armstrong was the first person to walk on the moon" and output, "Neil Armstrong was born on the 5 Aug. 1930".

Figure 5:
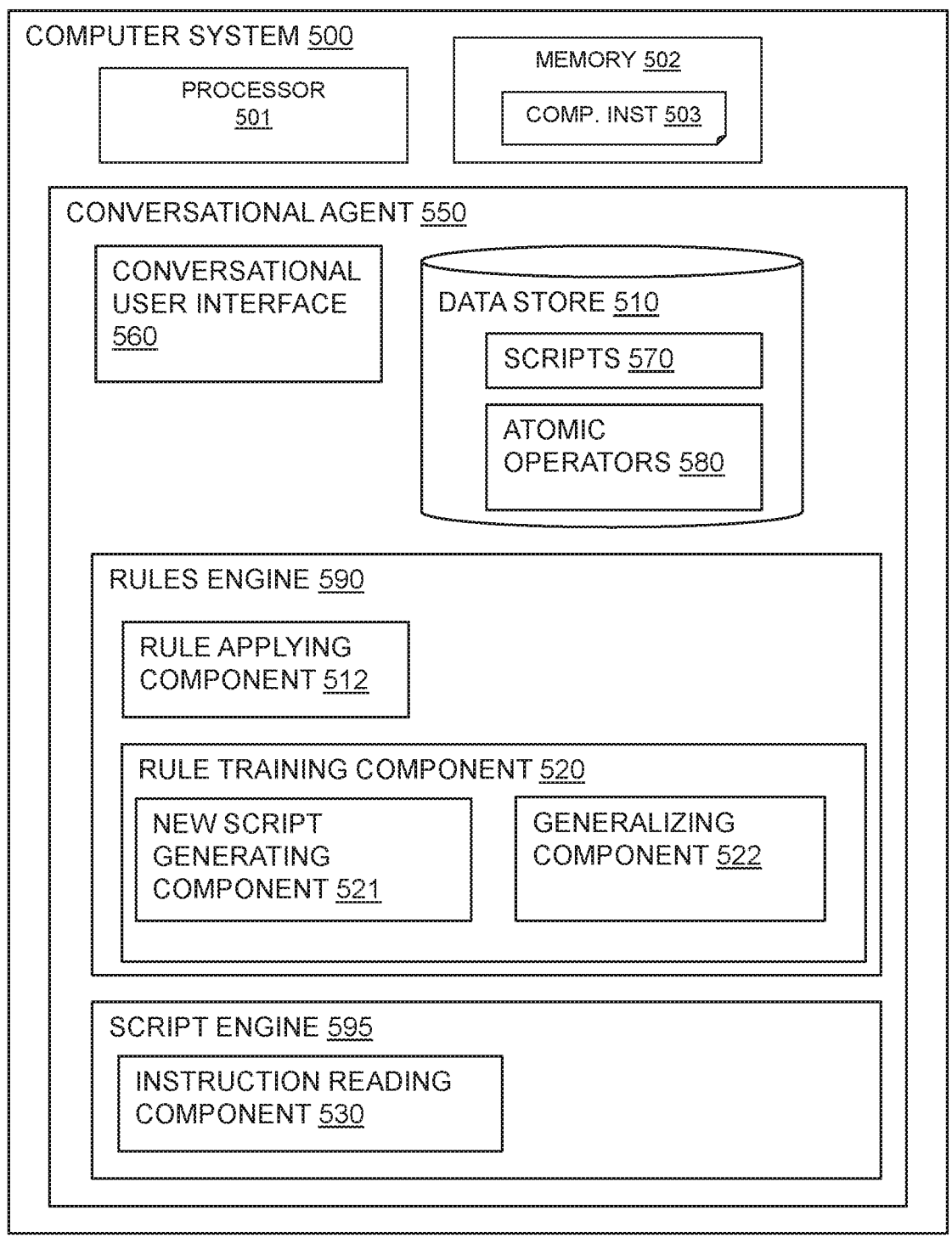
FIG. 5 is a block diagram illustrating a computer system having a conversational agent, in accordance with embodiments of the present disclosure.

Referring to FIG. 5, shown is a block diagram illustrating a computer system 500 in which illustrative embodiments of the present disclosure may be implemented.

The computer system 500 includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components. A conversational agent 550 (e.g., conversational agent 100) may be provided at a remote server with a conversational user interface 510 (e.g., conversational user interface 110) made available to clients for user interaction via natural language input.

The conversational agent 550 may include a data store 510 of a set of atomic operators 580 (e.g., atomic operators 140) for executing defined operations by applying atomic operator rules and a set of scripts 570 (e.g., scripts 130) developed during the training of the conversational agent 550. A script 570 includes a sequence of atomic operators 580 and natural language inputs and is configured to define a hierarchy of scripts due to mappings of the natural language inputs to other scripts.

The conversational agent 550 includes a rules engine 590 (e.g., rules engine 150) configured to perform natural language processing and machine learning processing.

The rules engine 590 includes a rule applying component 512 configured to map rules of natural language inputs to atomic operators or scripts. The rules engine 590 further includes a rule training component 520 configured generate new scripts and generalize existing scripts. The rule training component 520 may include a new script generating component 521 configured to generate a new script using atomic operators and natural language inputs and a generalizing component 522 configured to generalize mappings of new natural language inputs to existing scripts. In some embodiments, the generating component can be configured to automatically generalize scripts to cover new natural language inputs based on similar structure and/or values of natural language inputs (e.g., by using similarity thresholds and/or value identifications).

The conversational agent 100 includes a script engine 120 for reading instructions from a mapped script and executing the defined operations of the atomic operators of the script.

The script engine 120 may include an instruction reading component 530 for loading a script into an instruction vector and iterating through the instruction vector reading each instruction in turn and testing it by applying the mapping rules at the rules engine to execute the defined operations of the atomic operators.

Figure 6:
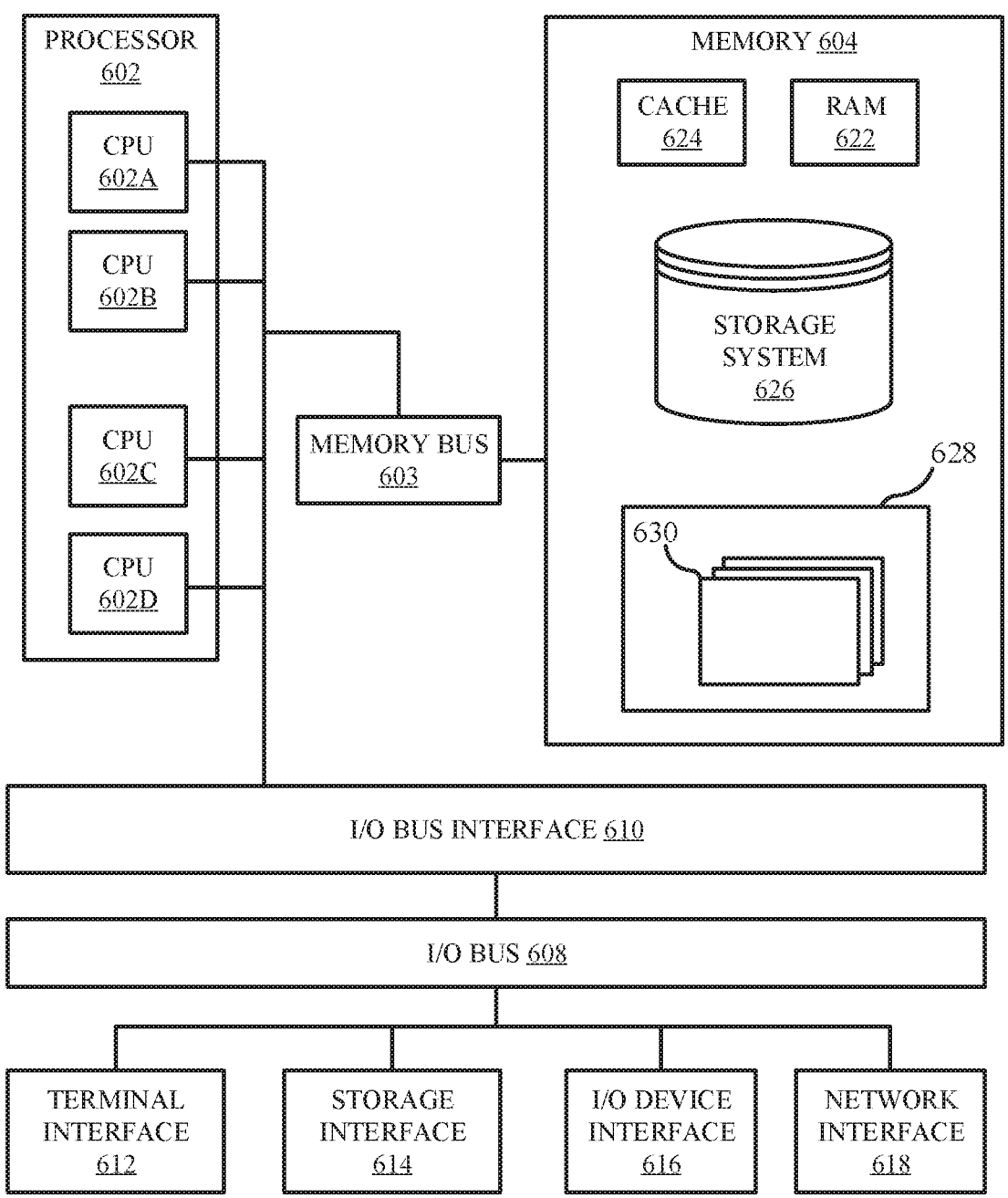
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 (e.g., conversational agent 100 and computer system 500) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

In some embodiments, the program modules 630 of the computer system 601 include a conversational agent training module. The conversational agent training module can be configured to initiate a conversational agent with a set of atomic operators, each atomic operator including a set of atomic operator rules. The conversational agent training module may further include a conversational user interface for receiving natural language input. The conversational agent training module can further be configured to determine whether the natural language input maps to an existing script by referencing a rules engine. In response to a determination that the natural language input does not map to an existing script, the conversational agent training module can be configured to request calcification from the user. Training can then be received from the user, and a mapping rule which maps the natural language input to a script can be stored. The conversational agent training module can then be configured to execute the script per the user's training.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
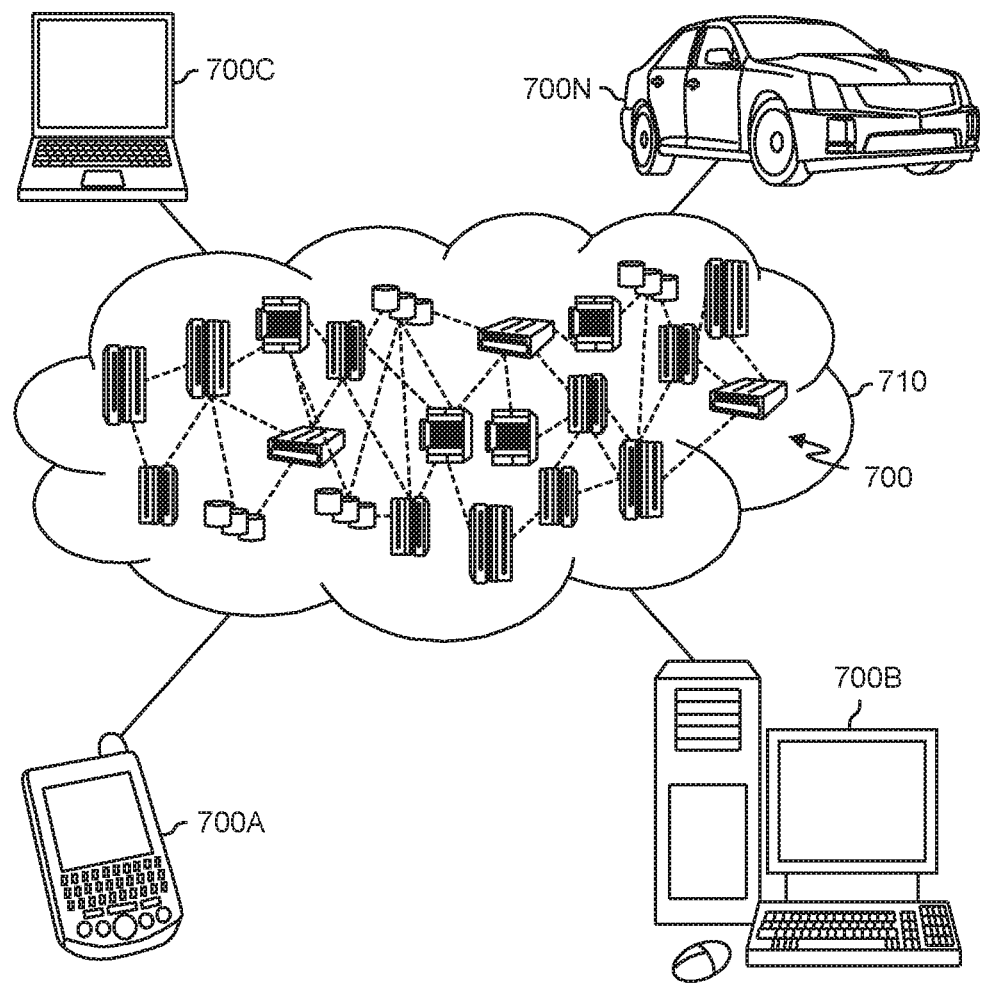
FIG. 7 is a diagram illustrating a cloud computing environment, in accordance with embodiments of the present disclosure.

Referring now to FIG. 7, illustrative cloud computing environment 710 is depicted. As shown, cloud computing environment 710 includes one or more cloud computing nodes 700 with which local computing devices used by cloud consumers, such as, for example, personal digital assistant (PDA) or cellular telephone 700A (e.g., conversational agent 100 and computer system 500), and/or automobile computer system 700N can communicate. Nodes 700 can communicate with one another. They can be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
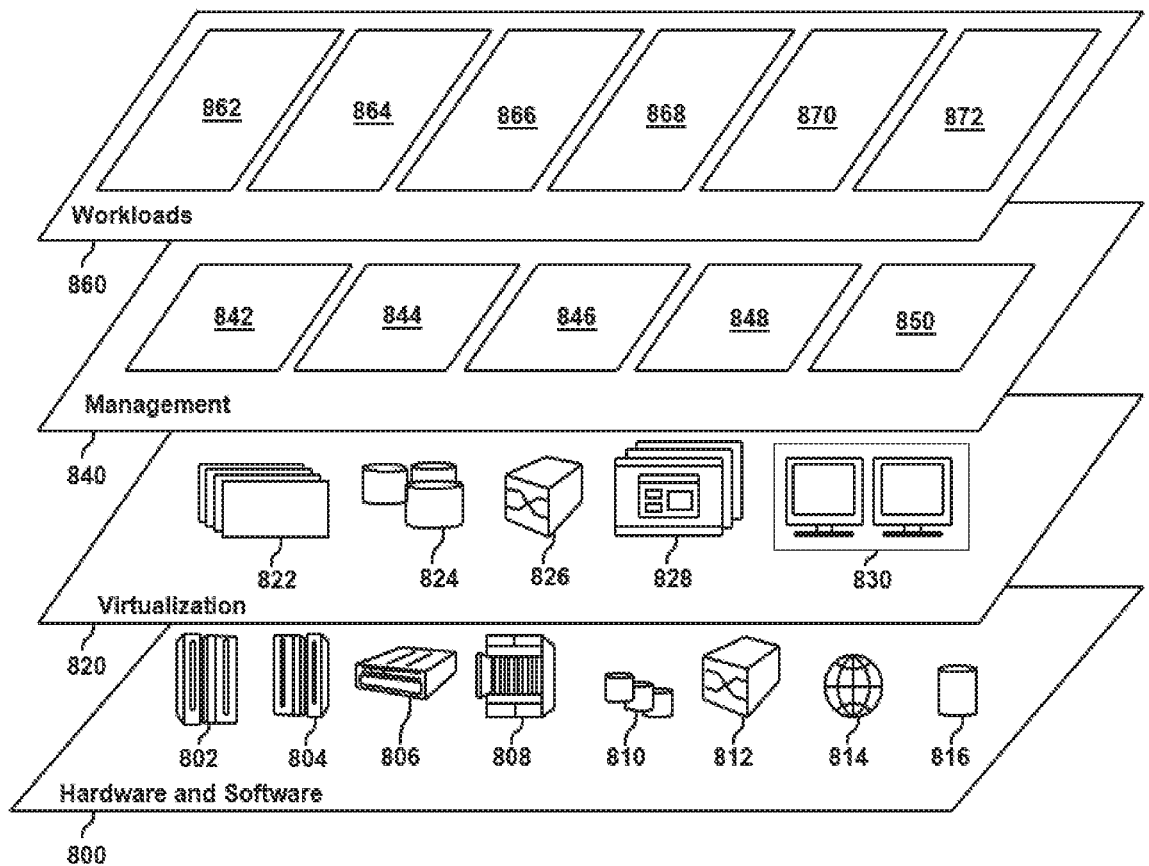
FIG. 8 is a block diagram illustrating abstraction model layers, in accordance with embodiments of the present disclosure.

Referring now to FIG. 8, a set of functional abstraction layers provided by cloud computing environment 710 (FIG. 7) is shown. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. For example, resource provisioning 842 can allocate additional computing resources to devices which are indicated to have high activity. Metering and Pricing 844 provide cost tracking as resources are utilized within the cloud computing environment, and billing or invoicing for consumption of these resources. In one example, these resources can include application software licenses. In some embodiments, Metering and Pricing 844 indicates the number of allotted licenses to machines in the system. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and identifying an identifiable media 872.

As discussed in more detail herein, it is contemplated that some or all of the operations of some of the embodiments of methods described herein may be performed in alternative orders or may not be performed at all, insofar as they are consistent herein; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for training a conversational agent using natural language, comprising:
   initiating the conversational agent with a set of atomic operators, each atomic operator having one or more atomic operator rules for executing operations;
   receiving a text query from a user on a conversational interface;
   determining whether the text query maps to an existing script by referencing a rules engine having a plurality of mapping rules;
   requesting, in response to a determination that the text query does not map to an existing script, training from the user;
   receiving, in response to requesting training from the user, a plurality of text inputs from the user, the plurality of text inputs including atomic operators configured to, in sequence, generate a new script, return a correct answer to the text query, display the correct answer, and end the new script;
   creating, in response to receiving the plurality of text inputs from the user, the new script;
   storing a mapping rule which maps the text query to the new script; and
   executing, in response to receiving training from the user, the new script, wherein executing the new script leads to displaying the correct answer on the conversational interface.

2. The method of claim 1, further comprising generalizing an existing mapping rule to map the text query to the new script.

3. The method of claim 2, wherein generalizing the existing mapping rule includes:
   identifying terms in the text query which are identical to terms in an existing natural language rule; and
   generalizing non-identical terms between the text query and the existing natural language rule by replacing the non-identical terms with a superclass which encompasses the non-identical terms.

4. The method of claim 2, wherein generalizing includes handling the text query the same as a previously entered natural language input.

5. The method of claim 1, wherein prior to receiving the text query, a primary script is loaded, the primary script configured to prompt the user for natural language input.

6. The method of claim 1, wherein executing the new script includes:
   loading the new script into an instruction vector, the new script having a set of instructions;
   iterating through the set of instructions;

identifying, while iterating through the set of instructions, a sub-script call out;
loading a sub-script corresponding to the sub-script call out into a second instruction vector;
iterating through a set of instructions of the sub-script; and
returning, after iterating through the set of instructions of the sub-script, to the new script to iterate through the remaining instructions of the set of instructions.

7. The method of claim 1, wherein the new script references at least one sub-script, wherein the at least one sub-script further includes a second sub-script.

8. A conversational agent comprising:
at least one memory component and at least one processor;
a data store of a set of atomic operators, each atomic operator having one or more atomic operator rules for executing operations;
a conversational interface configured to receive a text query input from a user;
wherein the at least one processor is configured to:
determine whether the text query maps to an existing script by referencing a plurality of mapping rules;
request, in response to a determination that the text query does not map to an existing script, training from the user;
receive, in response to requesting training from the user, a plurality of text inputs from the user, the plurality of text inputs including atomic operators configured to, in sequence, generate a new script, return a correct answer to the text query, display the correct answer, and end the new script;
create, in response to receiving the plurality of text inputs from the user, the new script;
store a mapping rule which maps the text query to the new script; and
execute, in response to receiving training from the user, the new script, wherein executing the new script leads to displaying the correct answer on the conversational interface.

9. The conversational agent of claim 8, wherein the at least one processor is configured to:
generalize an existing mapping rule to map the text query to the new script.

10. The conversational agent of claim 9, wherein generalizing the existing mapping rule includes:
identifying terms in the text query which are identical to terms in an existing natural language rule; and
generalizing non-identical terms between the text query and the existing natural language rule by replacing the non-identical terms with a superclass which encompasses the non-identical terms.

11. The conversational agent of claim 9, wherein generalizing includes handling the text query the same as a previously entered input.

12. The conversational agent of claim 8, wherein prior to receiving the text query, a primary script is loaded, the primary script configured to prompt the user for input.

13. The conversational agent of claim 8, wherein the at least one processor is further configured to:
load the new script into an instruction vector, the new script having a set of instructions;
iterate through the set of instructions;
identify, while iterating through the set of instructions, a sub-script call out;
load a sub-script corresponding to the sub-script call out into a second instruction vector;
iterate through a set of instructions of the sub-script; and
return, after iterating through the set of instructions of the sub-script; to the new script to iterate through remaining instructions of the set of instructions.

14. The conversational agent of claim 8, wherein the new script includes at least one sub-script, wherein the at least one sub-script further includes a second sub-script.

15. A computer program product for training a conversational agent using natural language, the computer program product comprising a computer readable storage medium having program instructions embodied therewith, the program instructions executable by a processor to cause the processor to perform a method comprising:
initiating the conversational agent with a set of atomic operators, each atomic operator having one or more atomic operator rules for executing operations;
receiving a text query from a user on a conversational interface;
determining whether the text query maps to an existing script by referencing a rules engine having a plurality of mapping rules;
requesting, in response to a determination that the text query does not map to an existing script, training from the user;
receiving, in response to requesting training from the user, a plurality of text inputs from the user, the plurality of text inputs including atomic operators configured to, in sequence, generate a new script, return a correct answer to the text query, display the correct answer, and end the new script;
creating, in response to receiving the plurality of text inputs from the user, the new script;
storing a mapping rule which maps the text query to the new script; and
executing, in response to receiving training from the user, the new script, wherein executing the new script leads to displaying the correct answer on the conversational interface.

16. The computer program product of claim 15, wherein the method performed by the processor further comprises generalizing an existing mapping rule to map the text query to the new script.

17. The computer program product of claim 15, wherein executing the new script includes:
loading the new script into an instruction vector, the new script having a set of instructions;
iterating through the set of instructions;
identifying, while iterating through the set of instructions, a sub-script call out;
loading a sub-script corresponding to the sub-script call out into a second instruction vector;
iterating through a set of instructions of the sub-script; and
returning, after iterating through the set of instructions of the sub-script, to the new script to iterate through the remaining instructions of the set of instructions.

18. A computer-implemented method for training a conversational agent using natural language, comprising:
initiating the conversational agent with a set of atomic operators, each atomic operator having one or more atomic operator rules for executing operations;
receiving a text query from a user on a text-based conversational interface;
determining whether the text query maps to an existing script by referencing a plurality of mapping rules;

requesting, in response to a determination that the text query does not map to an existing script, training from the user;

receiving a first text input from the user, the first text input including a first atomic operator configured to generate a new script;

receiving a second text input from the user, the second text input including a second atomic operator configured to perform a first function, the first function returning a correct answer to the text query;

receiving a third text input from the user, the third text input including a third atomic operator configured to display the answer output from the first function on the text-based conversational interface;

receiving a fourth text input from the user, the fourth text input including a fourth atomic operator configured to end the new script;

creating, in response to receiving the fourth text input, the new script;

storing a mapping rule which maps the text query to the new script with the plurality of mapping rules; and executing the new script, where executing the new script leads to displaying the correct answer on the text-based conversational interface.

19. A computer program product for training a conversational agent using natural language, the computer program product comprising a computer readable storage medium having program instructions embodied therewith, the program instructions executable by a processor to cause the processor to perform a method comprising:

initiating the conversational agent with a set of atomic operators, each atomic operator having one or more atomic operator rules for executing operations;

receiving a text query from a user on a text-based conversational interface;

determining whether the text query maps to an existing script by referencing a plurality of mapping rules;

requesting, in response to a determination that the text query does not map to an existing script, training from the user;

receiving a first text input from the user, the first text input including a first atomic operator configured to generate a new script;

receiving a second text input from the user, the second text input including a second atomic operator configured to perform a first function, the first function returning a correct answer to the text query;

receiving a third text input from the user, the third text input including a third atomic operator configured to display the answer output from the first function on the text-based conversational interface;

receiving a fourth text input from the user, the fourth text input including a fourth atomic operator configured to end the new script;

creating, in response to receiving the fourth text input, the new script;

storing a mapping rule which maps the text query to the new script with the plurality of mapping rules; and executing the new script, where executing the new script leads to displaying the correct answer on the text-based conversational interface.

\* \* \* \* \*